(12) United States Patent
Perlman et al.

(10) Patent No.: US 6,510,523 B1
(45) Date of Patent: Jan. 21, 2003

(54) METHOD AND SYSTEM FOR PROVIDING LIMITED ACCESS PRIVILEGES WITH AN UNTRUSTED TERMINAL

(75) Inventors: Radia J. Perlman, Acton, MA (US); Stephen R. Hanna, Bedford, MA (US)

(73) Assignee: Sun Microsystems Inc., Palo Alto, CA (US)

(*) Notice: Subject to any disclaimer, the term of this patent is extended or adjusted under 35 U.S.C. 154(b) by 0 days.

(21) Appl. No.: 09/253,550

(22) Filed: Feb. 22, 1999

(51) Int. Cl.[7] .................. G06F 11/30; G06F 15/16; G06F 15/173
(52) U.S. Cl. .............. 713/201; 709/225; 709/226; 709/229
(58) Field of Search ................ 713/200, 201, 713/155, 156, 182, 185, 202, 166; 380/279; 705/42, 43, 67, 56; 709/223, 224, 229

(56) References Cited

U.S. PATENT DOCUMENTS

| | | | |
|---|---|---|---|
| 5,475,756 A | * 12/1995 | Merritt | |
| 5,535,276 A | * 7/1996 | Ganesan | 713/155 |
| 5,721,781 A | * 2/1998 | Deo et al. | |
| 5,815,574 A | * 9/1998 | Fortinsky | 713/153 |
| 5,841,871 A | * 11/1998 | Pinkas | |
| 5,923,756 A | * 7/1999 | Shambroom | 713/156 |
| 5,982,898 A | * 11/1999 | Hsu et al. | 713/156 |
| 5,987,232 A | * 11/1999 | Tabuki | |
| 6,169,803 B1 | * 1/2001 | Sako et al. | |

FOREIGN PATENT DOCUMENTS

EP    1026641 A1  *  8/2000

OTHER PUBLICATIONS

Menezes, A. et al. Handbook of Applied Cryptography. CRC Press. CIP 1996. pp. 500–503.*
Neuman C. "The Kerberos Network Authentication Service (V5)." Request for Comments 1510. Sep. 1993.*
Schneier, B. Applied Cryptography, Second Edition. John Wiley and Sons. CIP 1995. pp. 566–571.*

* cited by examiner

*Primary Examiner*—Gail Hayes
*Assistant Examiner*—Jenise Jackson
(74) *Attorney, Agent, or Firm*—Finnegan, Henderson, Farabow, Garrett & Dunner, L.L.P.

(57) ABSTRACT

A method and system for providing limited access privileges with an untrusted terminal allows a user to perform privileged operations between the untrusted terminal and a remote terminal in a controlled manner. The user can establish a secure communications channel between the untrusted terminal and a credentials server to receive credentials therefrom. Once the user receives the credentials, the secure communications channel is closed. The user can then use the credentials to perform privileged operations on a remote terminal through the untrusted terminal. The remote terminal knows to grant the user limited privileges based on information included in the credentials. The effects of malicious actions by the untrusted terminal are limited and controlled.

24 Claims, 2 Drawing Sheets

METHOD AND SYSTEM FOR PROVIDING LIMITED ACCESS PRIVILEGES WITH AN UNTRUSTED TERMINAL

FIELD OF INVENTION

The present invention relates generally to computer security and, more particularly, to a method and system for providing limited access privileges with an untrusted terminal that allow a user to perform privileged operations over a network in a controlled manner.

RELATED ART

Conventionally, only secure and trusted terminals are used to perform privileged operations, such as viewing confidential information or authorizing financial transactions. In recent years, increased travel and improved communications have increased the need to perform such operations at times and places where a trusted terminal may not be available. For example, when away from the office on business with no trusted terminal handy, a corporate executive may wish to access confidential electronic corporate files from a hotel computer. However, information displayed on this computer may be videotaped without knowledge of the corporate executive and reviewed by personnel who may later disclose it to the press. With current technology, the corporate executive and others are confronted with serious security issues, even when using a password or other secret to access the information.

A trusted terminal is a system that is trusted to be secure enough to allow all privileged operations to be requested and/or performed. For instance, a trusted terminal might be located in a secure environment and configured to send and receive encrypted messages. An untrusted terminal is a system that is not trusted to be secure enough to allow all our privileged operations to be requested and/or performed. For instance, an untrusted terminal might be unable to establish a confidential connection to remote systems. It might have hostile software installed that attempts to execute unauthorized operations. Any terminal that is not known to be trusted should normally be considered untrusted.

If a user wishes to access a remote server from an untrusted terminal, the server may require the user to enter in their user name and password (or secret). The untrusted terminal, however, may capture the user name and password, without the user's knowledge, to use at a later time. This operation allows the untrusted terminal to access the user's remote server account at any time, thus seriously jeopardizing the integrity of the information stored in the remote server. In addition, the untrusted terminal may simply disclose to a third party confidential information that passes through it during a session without the user's knowledge. Therefore, a need exists for a method and system that significantly reduces or eliminates risks typically associated with using an untrusted terminal to perform privileged operations.

There are current solutions which attempt to reduce or eliminate the aforementioned risks. One such solution establishes two separate accounts—one untrusted terminal account and one trusted terminal account—for a user wishing to perform privileged operations remotely. To perform privileged operations through an untrusted terminal, the user logs into the untrusted terminal account, which provides only limited access privileges. To perform privileged operations through a trusted terminal, the user logs into the trusted terminal account, which provides increased privileges. While providing limited access to confidential information, this solution is susceptible to password or secret capture by the untrusted terminal. That is, the untrusted terminal can capture user access information and perform operations allowed by the untrusted terminal account at a later time without the user's authorization.

Authentication tokens have been used to overcome the problem described above with respect to an untrusted terminal capturing a user's password to perform unauthorized operations. An authentication token is a physical device that can generate passwords. There are a variety of authentication tokens currently available in the marketplace including time-synchronized authentication tokens and challenge-response authentication tokens. The use of authentication tokens with untrusted terminals, however, is still subject to several problems. For example, there is no time limit on a user's session with the password generated by the authentication token. Thus, the untrusted terminal can keep the session open indefinitely to perform unauthorized operations. Also, each use of the authentication token only authenticates with a single remote server. It is desirable to provide authenticated access to multiple remote servers without requiring repeated use of an authentication token.

Another current solution involves the use of a smart card that has a user's encryption code, such as a private key used in a public key cryptography scheme. Using the smart card in connection with the untrusted terminal, the user can encrypt, decrypt, or sign data passed through the untrusted terminal without disclosing the user's encryption code to the terminal. However, there are two problems with this solution. First, the untrusted terminal may seize this opportunity to perform unauthorized operations using the private key from the smart card. Second, trusted hosts cannot determine whether the user is using an untrusted or trusted terminal. Consequently, the host may send the user confidential data or grant the user privileges that are not appropriate under the circumstances. In addition, most terminals currently are not equipped with smart card readers, thereby limiting smart card usage.

A further current solution involves using a gateway connected to a communication network (e.g., the Internet) to restrict access to information on a remote server. In this instance, the user establishes a connection with the gateway through an untrusted terminal. Once the connection is established, the user identifies herself to the gateway which determines the scope of access to the remote server. For this solution to be effective, however, the gateway must be able to determine the appropriate restrictions for each access request to the remote server based on the user's identity. The gateway solution has all the disadvantages of whatever technique is used to authenticate with the gateway (e.g., password and authentication token). Its primary advantage is that it does not require changes to remote server software. However, the gateway must understand the protocols used to communicate with the remote server software. Furthermore, depending on the nature of this protocol, it may not be possible to provide appropriate access controls, such as filtering out confidential e-mail. Also, the gateway does not usually distinguish between a trusted workstation and an untrusted workstation.

SUMMARY OF THE INVENTION

Accordingly, a need exists for a system that overcomes the shortcomings of conventional technology by allowing a user to perform privileged operations safely over a network through an untrusted terminal while limiting breaches that might be caused by a hostile environment. It is further desirable to indicate to a host terminal that a user is connected to an untrusted terminal. This feature would allow the host to determine the appropriate level of user privileges.

Methods and systems consistent with the present invention, embodied and broadly described herein, provide limited access privileges to a network with an untrusted terminal by establishing a secure communications channel between the untrusted terminal and a credentials server, sending credentials specific to the untrusted terminal from the credentials server to the untrusted terminal over the secure communications channel, and using the credentials to perform privileged operations over the network through the untrusted terminal.

Additional desires, features and advantages of the invention are set forth in the following description, apparent from the description, or may be learned by practicing the invention. Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the preceding general description and the following detailed description, explain the principles of the invention.

In the drawings.

DETAILED DESCRIPTION

Reference will now be made in detail to the construction and operation of an implementation consistent with the present invention that are illustrated in the accompanying drawings. In those drawings, like elements and operations are designated with the same reference numbers.

Systems consistent with the present invention provide a solution to the problem of performing privileged operations through an untrusted terminal connected to a network (e.g, the Internet) while limiting breaches that might be caused by a hostile environment. With the growing reliance on the Internet, the need for such a solution is clear. Business travelers often wish to check their e-mail or customer accounts while off-site. The e-mail messages or customer accounts may include confidential information that should be protected from public disclosure. In some instances, the business traveler may use an untrusted terminal with an Internet connection to perform privileged operations remotely. However, the business traveler runs the risk of compromising the integrity of information when using an untrusted terminal that may be configured, designed, or used to take hostile action, such as monitoring or modifying communications.

Methods consistent with this invention allow the business traveler to use an untrusted terminal to perform certain limited privileged operations, even if the terminal is actively hostile and designed to monitor or modify communications with malicious intent. This is accomplished by obtaining credentials—information used to prove one's identity and/or access privileges in an authentication or authorization exchange—from a credentials server connected to the network and using this identification to request that privileged operations be performed on a remote terminal. The credentials supplied by the credentials server may be marked to indicate that an untrusted terminal is in use and the operations permitted may be limited to those which can be safely performed from such a terminal. Other limitations may also be imposed by the credentials server or the remote terminal.

Figure 1:
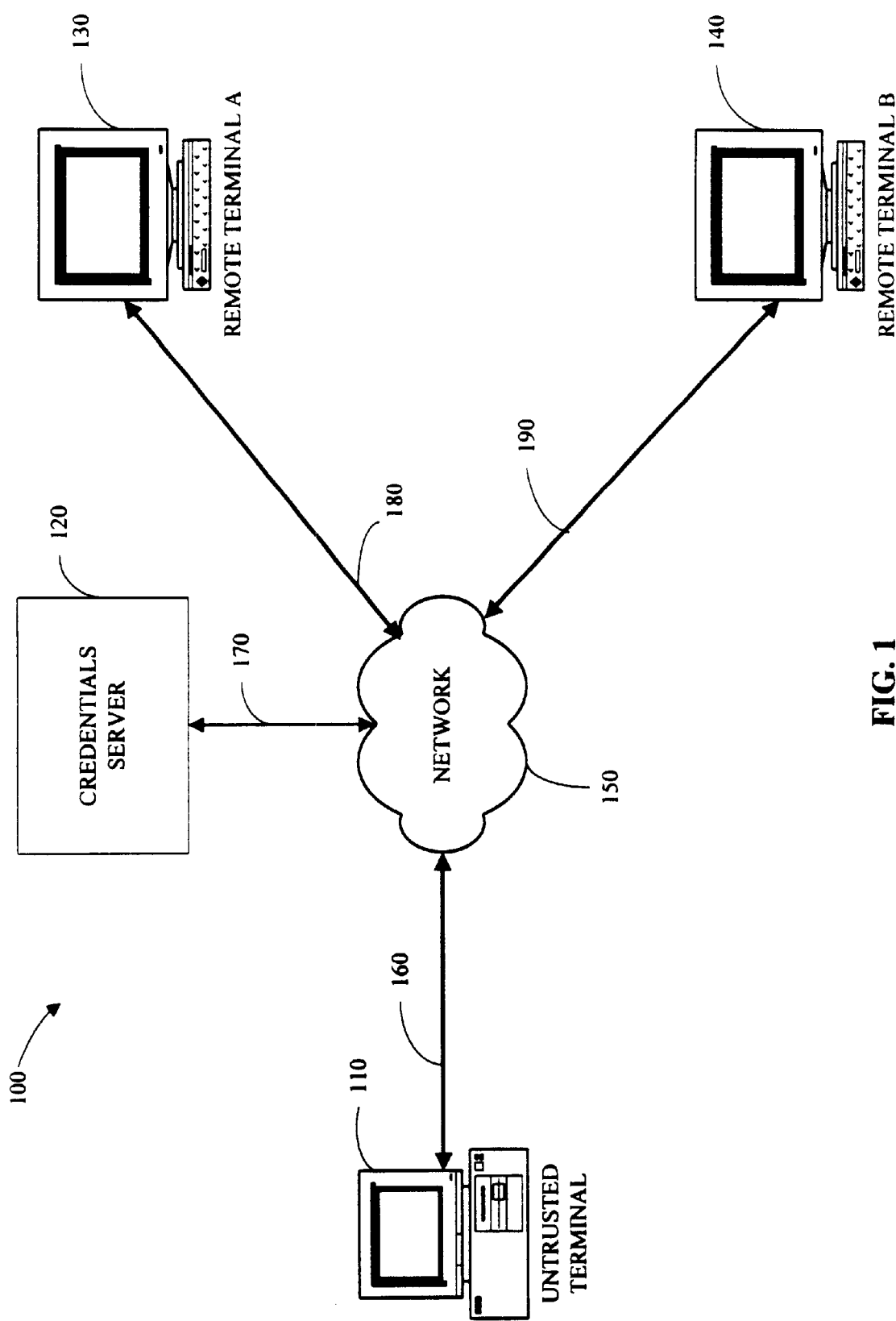
FIG. 1 is a block diagram of a system for restricting user privileges through an untrusted terminal connected to a network consistent with the present invention.

FIG. 1 illustrates a limited security system 100 for restricting user access privileges through an untrusted terminal connected to a network consistent with the present invention. Limited security system 100 includes an untrusted terminal 110, credentials server 120, a Remote Terminal "A" 130, and a Remote Terminal "B" 140 connected by network 150.

Untrusted terminal 110 is a device capable of communicating with network 150 (e.g., via a modem or other communications device). Untrusted terminal 110 may have Internet access capabilities to communicate with remote terminals worldwide. Thus, if a user is vacationing in Australia, for example, they would be able to connect with their company server in Spokane, Washington via untrusted terminal 110. In addition, untrusted terminal 110 may include software that allows the user to locate and access information on remote terminals connected to network 150. One type of software suitable for this purpose is a web browser, such as Netscape Navigator, which enables untrusted terminal 110 to connect to a server having a unique uniform resource locator (URL). Untrusted terminal 110 may contain access software or be able to download access software from the server for execution. The access software may be written in the Java™ programming language or another language. Java is a trademark of Sun Microsystems Corporation. Moreover, untrusted terminal 110 may be capable of generating private keys for authentication purposes and encryption.

Credentials server 120 is a device (e.g., server) connected to network 150 that is capable of generating credentials (e.g., a private key and a public key certificate) trusted by one or more remote terminals. Credentials server 120 issues credentials to a user to permit privileged operations. These credentials typically include public key certificates. However, credentials server 120 can issue various kinds of credentials, depending on the requests from untrusted terminal 110. This capability allows untrusted terminal 110 to receive Kerberos credentials, private key/certificate pairs, or other types of credentials from credentials server 120. These credentials should have limited privileges and a limited lifetime, since they are being granted to an untrusted terminal.

Remote Terminal A 130 and Remote Terminal B 140 are computers connected to network 150 that can send data to and receive data from untrusted terminal 110. One remote terminal can be the user's company server and the other can be the server of a financial institution. Each terminal is capable of performing privileged operations, such as providing remote access to files and other data stored therein. One skilled in the art will appreciate that the number of remote terminals connected to network 150 can be virtually unlimited, thus, allowing a user to connect to virtually any computer on the network. To allow for such an unlimited number of connected terminals, network 150 may be a WAN, such as the Internet.

Figure 2:
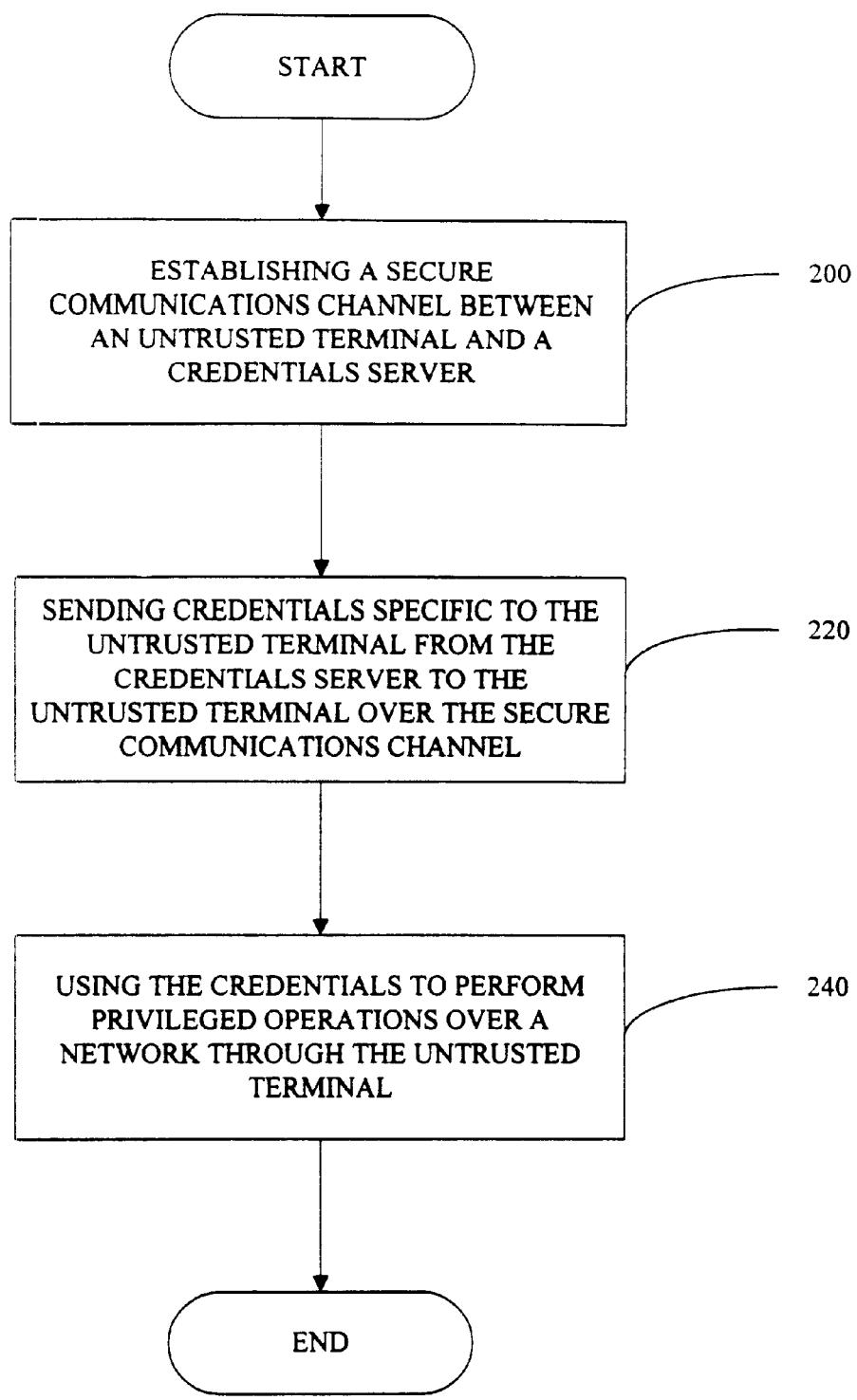
FIG. 2 is a flowchart of steps for providing limited access privileges with an untrusted terminal connected to a network consistent with the present invention.

FIG. 2 is a flowchart of steps used to provide limited access privileges with an untrusted terminal connected to a network consistent with the present invention. Initially, a secure communications channel is established between an untrusted terminal and a credentials server (step 200). As part of establishing the secure communications channel, the credentials server must identify the untrusted terminal as "untrusted." This identification can be established using a variety of mechanisms. For example, the credentials server may identify a terminal as trusted or untrusted based on the network address of the terminal. In addition, a firewall connected to the credentials server may insert a flag into a data packet of a request to establish a secure communications channel indicating that the terminal generating the request should not be trusted (i.e., because the request originated outside of the credentials server network). Alternatively, a terminal may prove that it is trusted by demonstrating knowledge of a secret or a private key whose public key has been certified as belonging to a trusted workstation. Moreover, if a terminal simply cannot prove it should be trusted, the credential server can identify the terminal as untrusted when establishing the secure communication channel.

The secure communications channel may provide authentication (mutual or one-way), integrity protection, and/or confidentiality. Confidentiality is not required in many cases and may be prohibited by policy or law under certain circumstances. In general, authentication of the user at the untrusted terminal is required. Kaufman, Perlman, and Speciner, *Network Security: Private Communication in a Public World*, Prentice Hall PTR (1995) (hereinafter "*Network Security*") includes a discussion of cryptographic algorithms suitable for use with implementations consistent with the present invention.

Various techniques may be employed to establish the secure communications channel, many of which are described in *Network Security*. In addition, an authentication token may be used to establish a secure communications channel as described in a co-pending U.S. patent application filed by the inventors on Jul. 31, 1998 entitled "Methods and Systems for Establishing a Shared Secret Using an Authentication Token," Ser. No. 09/126,659 and incorporated herein by reference. At least one method and system described in this referenced application uses an authentication token to display a character string that a user enters into his terminal. The character string can then be modified using a predetermined function known to the user's terminal and a remote terminal (i.e., server). The user sends the modified character string to the remote terminal over a network. Upon receipt, the remote terminal determines the original character string from a number of possible matching character strings. The user's terminal and remote terminal then use the matching character string to establish a shared secret to encrypt or otherwise protect information transferred therebetween. Other techniques for establishing a secure communications channel may also be employed.

Having established a secure communications channel, the user communicates with credentials server 120 using the untrusted terminal. In one implementation, the user can request credentials, such as a private key and a public key certificate, from credentials server 120, with which the user is registered. Both the private key and the public key may be represented as an alphabetic or numeric record (e.g., a 64-bit number). Although the private key is kept secret, the public key may be published. In another implementation, the private and public keys can be generated by the untrusted terminal. In this instance, the public key is sent to credentials server 120 so that it can generate a certificate for this key. This technique works better when the secure communications channel does not include encryption, which may be banned in some cases (e.g., for legal reasons).

In many public key systems, public keys are verified and access is granted based on a chain of certificates. With such systems, the credentials might include one or more certificates that complete such a chain. For instance, the credentials may include a chain of identity certificates to establish the name associated with a given public key. In addition, the credentials may include one or more delegation certificates delegating privileges associated with one key to another key. For instance, the user may sign a delegation certificate for the credentials server, which may sign a delegation certificate for the untrusted terminal. Either or both of these delegation certificates may include limited privileges. Alternatively, the credentials server might have a copy of the user's private key and use this to directly sign a delegation certificate for the untrusted terminal.

Variations on the foregoing techniques may be implemented in providing limited access privileges with an untrusted terminal. For example, the credentials can be marked to indicate that the holder of the private key is logged in through an untrusted terminal. In addition, the credentials may grant a user limited access and include a time limit for their use (e.g., an hour or two). The credentials may also include a variety of information regarding the type of privileges to be granted to the user (e.g., broad or specific), restrictions on which terminals will honor the credentials, data identifying the user, and other information that is pertinent for authenticating or authorizing a user.

After creating the credentials, the credentials server sends them to the untrusted terminal (step 220). The credentials server, at this point, may close the secure communications channel. Thus, in order to communicate with the credentials server after receiving the credentials, the user must establish a new secure communications channel using the aforementioned techniques. Moreover, when the credentials expire, the user must establish a new secure communications channel with the credentials server to request new credentials if they wish to continue the session. This process can be repeated by the user as many times as necessary to complete a session.

Before expiration, the user can employ the credentials to perform privileged operations to the extent provided by the credentials or a remote terminal (step 240). That is, access to privileged information is controlled by the credentials and the remote terminal. For example, the credentials may only allow the user to access e-mail or specific client accounts.

Since the user must register with the credentials server before being issued credentials, the extent of the privileges indicated in these credentials is predetermined. The remote terminal, however, may increase or further limit a user's access regardless of the privileges granted by the credentials. This safeguard ensures that the remote terminal has ultimate control over privileged operations. In addition, the remote terminal must trust and honor credentials generated by the user's credentials server before permitting privileged operations. This requirement not only enhances the authentication of the user, but also prevents a hacker from performing privileged operations under false pretenses.

Implementations consistent with the present invention provide other safeguards in preventing or limiting the effects of a security breach. First, the user may be explicitly identified in the credentials issued by the credentials server as coming in through an untrusted terminal, therefore, their actions may be limited or logged for closer checking. If the user attempts to exceed the access restrictions set forth by the credentials or remote terminal, this attempt can be logged. In addition, the credentials may include time limitations on using the untrusted terminal. These time limitations may be predetermined by the user or determined by the credentials server when the user requests the credentials. Requiring the user to obtain new credentials every three hours, for example, can reduce the possibility or limit the effects of a security breach. These safeguards may also be used for trusted terminals when competitors are lurking nearby. However, in this instance, the trusted terminals might be considered untrusted for security reasons.

An example of an implementation consistent with the present invention will now be described. In this example, an employee works for a fictitious company, Widget, Inc., and is planning a business trip to Europe. Before leaving for Europe, the employee contacts credentials server 120 (e.g., ABC Credentials server, Inc.) to set up an account. The account can include personal, business, travel, and other information about the employee, such as the type of accounts the employee may wish to access when using an untrusted terminal and the types of privileges to be granted. After addressing these preliminary matters, the employee leaves for Europe on a 10-day business trip. During this trip, the employee plans to check his e-mail messages and access customer account information.

While in Europe, the employee locates untrusted terminal 110 in his hotel. The employee uses this terminal to establish a secure communications channel over communication lines 160 and 170, which connect untrusted terminal 110 and credentials server 120 via network 150. This connection allows the employee to request credentials from credentials server 120. Untrusted terminal 110 generates a public/private key pair, packages the public key into a request for credentials, sends this request as an authenticated message to credentials server 120 which processes the request and, based on the employee's predetermined registration information, issues the requested limited credentials for a three hour period. These credentials consist of a short-lived delegation certificate signed by the credentials server 120 and a long-lived delegation certificate signed by the employee. The short-lived delegation certificate signed by the credentials server 120 indicates that the holder of the private key corresponding to the public key provided by the untrusted terminal 110 is acting on behalf of the employee but using an untrusted terminal. The long-lived delegation certificate signed by the employee indicates that the credentials server 120 should be allowed to issue delegation certificates on behalf of the employee. The short-lived delegation certificate has an expiration time shortly after its issue time, whereas the long>lived delegation certificate has an expiration time substantially after its issue time. After issuing the credentials, credentials server 120 disconnects from the communication channel established by the employee.

Upon receiving the credentials, the employee can access his e-mail account on Remote Terminal A 130, the Widget, Inc. server. For example, this is accomplished by typing the URL of Remote Terminal A 130 into a web browser operating on untrusted terminal 110. Upon receiving this entry, untrusted terminal 110 uses the public/private key pair previously generated and the credentials received from credentials server 120 to establish an authenticated communications channel to Remote Terminal A 130. Based on these credentials, Remote Terminal A 130 consults its access control policy and decides to allow access to e-mail through this connection until the credentials expire. However, it decides to filter out highly confidential e-mail messages so they are not displayed to the employee and mark all messages originating from the connection as coming from an untrusted terminal and therefore potentially suspect.

Implementations described herein allow a user to perform privileged operations over a network through an untrusted terminal. A user can quickly and easily communicate with a remote terminal through an untrusted terminal to perform privileged operations using credentials issued from a credentials server. The credentials notify the remote terminal that a user is connected to an untrusted terminal, allowing the remote terminal to determine the appropriate level of user privileges. Moreover, the credentials allow the remote terminal to encrypt confidential information before sending it over the network, if desired. Thus, the integrity of the information transferred between the remote terminal and untrusted terminal is safeguarded during the user's session.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A method of providing access privileges, comprising:
    establishing a communications channel between a terminal and a credentials server;
    the credentials server determining whether or not the terminal can be trusted;
    if it is determined that the terminal cannot be trusted:
        designating the terminal as untrusted; and
        sending credentials specific to the untrusted terminal from the credentials server over the communications channel, wherein the access privileges provided are a function of the credentials sent to the terminal.

2. The method of claim 1, wherein the credentials sent to a terminal that has been determined to be an untrusted terminal are different from credentials that would be sent to a terminal that has been determined to be trusted.

3. The method of claim 1, wherein the access privileges that are a function of the credentials sent to the untrusted terminal are a subset of the access privileges that would be provided if it was determined that the terminal could be trusted.

4. The method of claim 1, wherein the access privileges that are a function of the credentials sent to the untrusted terminal are different from the access privileges that would be provided if the terminal was determined to be trusted.

5. The method of claim 1, wherein the credentials are valid for a predetermined period of time.

6. The method of claim 1, wherein the communications channel is a secure communications channel.

7. The method of claim 1, further comprising:
    the credentials server authenticating a user of the terminal.

8. The method of claim 7, further comprising:
    if the credentials server determines that the user is authentic:
        access privileges, as a function of the credentials sent to the terminal, are granted to the user.

9. The method of claim 8, wherein:

the access privileges granted to the authenticated user at the untrusted terminal are a subset of access privileges that the authenticated user would have access to if the terminal was determined to be trusted.

10. The method of claim 8, wherein:

the access privileges granted to the authenticated user at the untrusted terminal are different from the access privileges that the authenticated user would have access to if the terminal was determined to be trusted.

11. A method of providing access privileges, comprising:

establishing a communications channel between a terminal and a credentials server;

determining whether the terminal can be trusted or not;

sending first credentials to the terminal from the credentials server, over the communications channel, if it is determined that the terminal cannot be trusted; and sending second credentials, different from the first credentials, to the terminal from the credentials server, over the communications channel, if it is determined that the terminal can be trusted;

wherein said first and second credentials are specific to the terminal; and wherein the access privileges are a function of the credentials sent to the terminal and said first credentials provide different access privileges than said second credentials.

12. The method of claim 11, further comprising:

authenticating a user of the terminal with the credentials server; and providing the user access privileges that are a function of the credentials sent to the terminal.

13. The method of claim 11, wherein the first and second credentials are valid for a predetermined period of time.

14. The method of claim 11, wherein the communications channel is a secure communications channel.

15. A computer-readable storage medium, having stored thereon machine-executable instructions, the execution of said instructions adapted to implement the method of any of claims 1–10.

16. A method of providing access privileges to a user at a terminal, the method comprising:

determining whether or not the terminal can be trusted;

if it is determined that the terminal cannot be trusted;

designating the terminal as untrusted; and sending, to the terminal, credentials that are specific to the untrusted terminal, wherein the access privileges provided to the user are a function of the credentials sent to the terminal.

17. The method of claim 16, wherein the credentials sent to a terminal that has been determined to be untrusted terminal are different from credentials that would be sent to a terminal that has been determined to be trusted.

18. The method of claim 16, wherein the access privileges that are a function of the credentials sent to the untrusted terminal are a subset of the access privileges that would be provided if it was determined that the terminal could be trusted.

19. The method of claim 16, wherein the access privileges that are a function of the credentials sent to the untrusted terminal are different from the access privileges that would be provided if it was determined that the terminal could be trusted.

20. The method of claim 16, wherein the credentials are valid for a predetermined period of time.

21. The method of claim 16, further comprising:

determining if the user of the terminal is authentic.

22. The method of claim 21, wherein, if it is determined that the user is authentic, the method further comprises:

granting access privileges, as a function of the credentials sent to the terminal, to the user.

23. The method of claim 22, wherein:

the access privileges granted to the authenticated user at the untrusted terminal are a subset of access privileges that the authenticated user would have access to if the terminal was determined to be trusted.

24. The method of claim 22, wherein:

the access privileges granted to the authenticated user at the untrusted terminal are different from the access privileges that the authenticated user would have access to if the terminal was determined to be trusted.

* * * * *